No. 843,288. PATENTED FEB. 5, 1907.
A. MASTER.
FRICTION CLUTCH.
APPLICATION FILED JUNE 15, 1905.
3 SHEETS—SHEET 1.
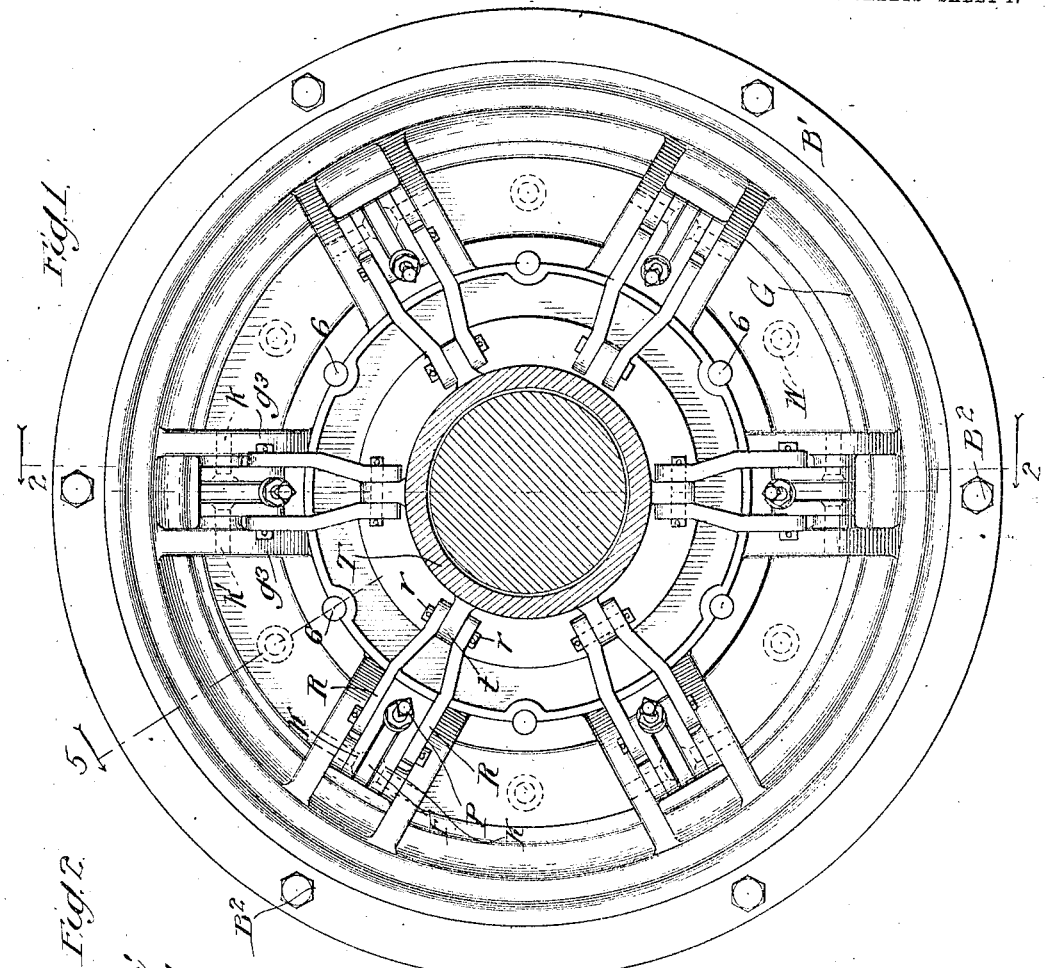
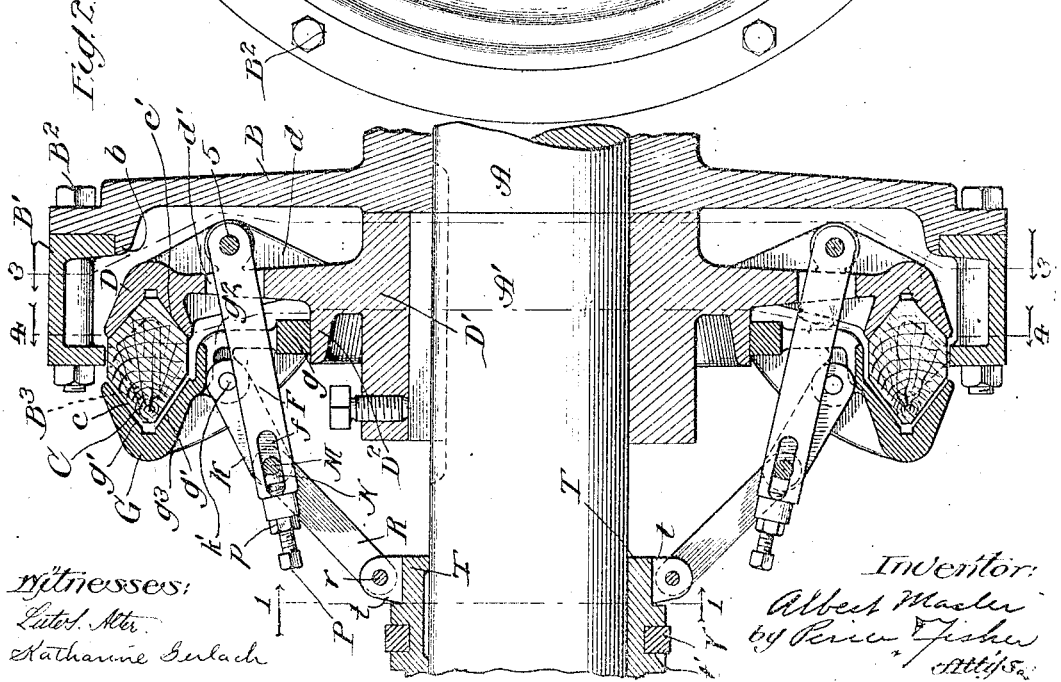
Witnesses:
Inventor:

No. 843,288. PATENTED FEB. 5, 1907.
A. MASTER.
FRICTION CLUTCH.
APPLICATION FILED JUNE 15, 1905.
3 SHEETS—SHEET 2.
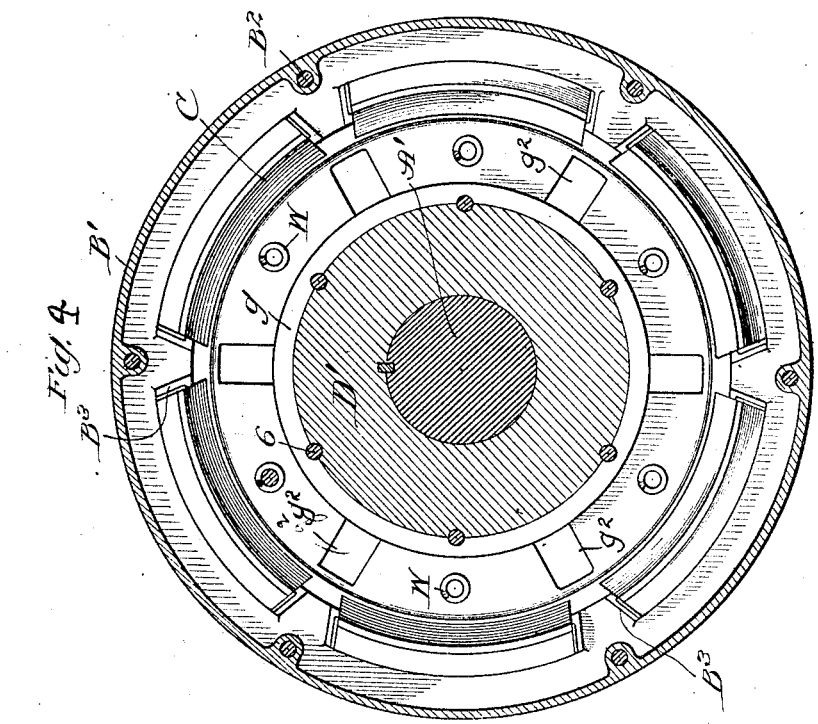
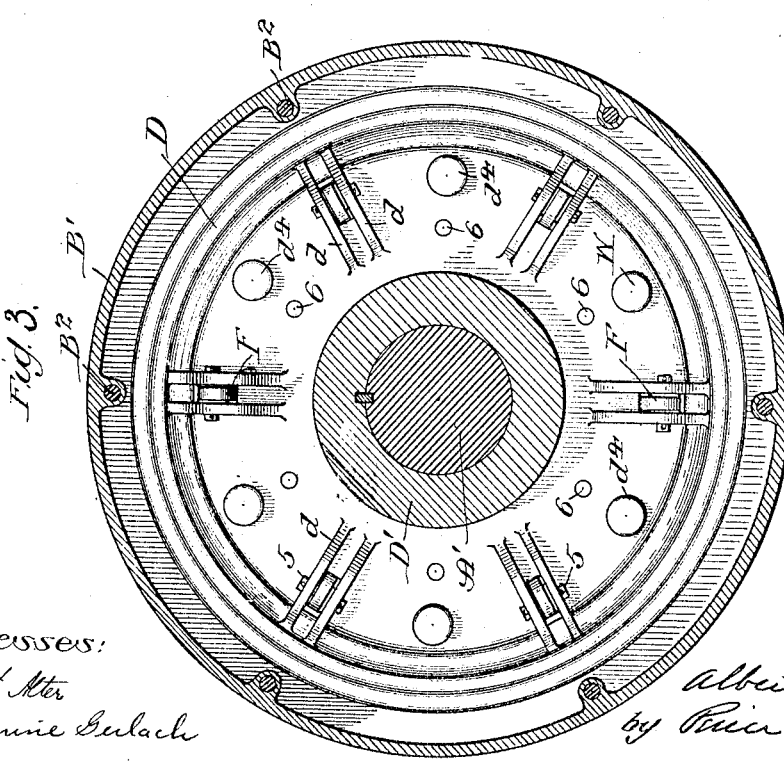

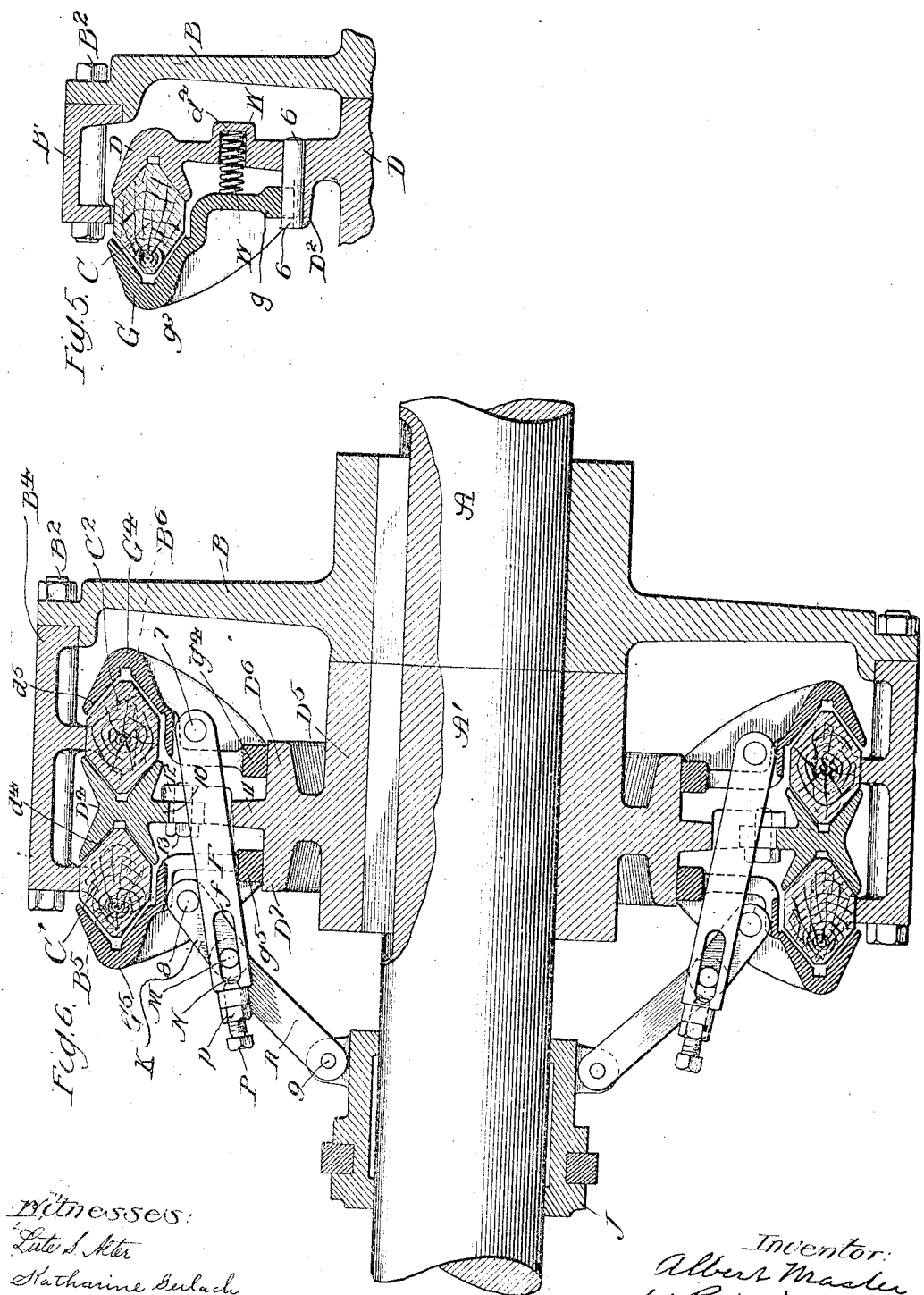

UNITED STATES PATENT OFFICE.

ALBERT MASTER, OF CHICAGO, ILLINOIS.

FRICTION-CLUTCH.

No. 843,288.  Specification of Letters Patent.  Patented Feb. 5, 1907.

Application filed June 15, 1905. Serial No. 265,327.

*To all whom it may concern:*

Be it known that I, ALBERT MASTER, a subject of the Kingdom of Great Britain, residing at Chicago, in the county of Cook and State of Illinois, have invented certain new and useful Improvements in Friction-Clutches, of which I do declare the following to be a full, clear, and exact description, reference being had to the accompanying drawings, forming part of this specification.

The object of the present invention is to provide a simple, durable, and most effective construction of friction-clutch, and this object is accomplished by the features of improvement hereinafter described, illustrated in the accompanying drawings, and particularly pointed out in the claims at the end of this specification.

Figure 1 is a front view of a friction-clutch embodying my invention. Fig. 2 is a view in vertical section on line 2 2 of Fig. 1. Fig. 3 is a view in vertical section on line 3 3 of Fig. 2. Fig. 4 is a view in vertical section on line 4 4 of Fig. 2. Fig. 5 is a view in vertical section on line 5 5 of Fig. 1. Fig. 6 is a view in central vertical section similar to Fig. 2, but showing a modified form of the invention.

In the accompanying drawings my improved clutch is shown as having its members mounted upon two shafts arranged in the same axial line; but it will be understood that the members of my clutch may be connected, respectively, to a shaft and a pulley or gear loosely mounted thereon, or, in fact, may be used in any of the ways in which friction-clutches of this character are commonly employed.

A and A' designate two shafts arranged in axial line with their ends abutting. Upon the shaft A is mounted one member and upon the shaft A' the other member of the clutch. The member mounted upon the shaft A comprises a plate or disk B, that carries at its outer end a drive-ring B'. Preferably this ring B' is an inverted-U shaped or channeled ring, and its inner flange rests upon a flange $b$, that projects inward from the face of plate B adjacent its periphery. The ring B' is connected to the plate B by means of a series of through-bolts $B^2$, that pass through the plate B and through offsets formed upon the inner face of the ring B'. The flange of the ring B', that is farthest from the disk B, is provided with a series of inwardly-extending radial arms or lugs $B^3$, between which are interposed the series of segmental friction-blocks C, that are preferably formed of wood. The faces of the arms or projections $P^3$, that engage the ends of the blocks, are preferably expanded in axial direction, as indicated in dotted lines in Fig. 2, so that comparatively broad surfaces are formed on the arms or lugs $B^3$, against which the ends of the blocks abut. The friction-blocks C thus necessarily rotate with the clutch member B, but are loosely inserted between the projections or arms $B^3$, so that they are free to move in axial direction or otherwise adjust themselves to accurately center within the clamping-jaws of the clutch, as hereinafter described.

The wooden blocks C may be of any suitable number, six of these segmental blocks being shown in the accompanying drawings, and the inner and outer sides of the blocks C are formed with the double-inclined bearing-faces $c$ and $c'$ to be engaged by the clamping-jaws of the clutch. In the preferred form of my invention these clamping-jaws comprise what, for convenience, I term the "fixed" jaw D and a "movable" jaw G. The fixed jaw D is formed with an annular V-shaped groove, the walls of which are adapted to engage with the correspondingly-inclined walls $c'$ of the segmental blocks C. The jaw D comprises a plate that is preferably cast integral with the hub D', that may be keyed to the shaft A'. From one side of the plate comprising the jaw D project a series of ribs $d$, through which pass pins or bolts 5, whereon are pivotally mounted the outer ends of the adjusting-rods F, that extend through holds $d'$ of the jaw D. Concentric with the hub D'; and preferably cast integral therewith, is a bearing-flange $D^2$, whereon is mounted in manner free to slide in axial direction the hub portion $g$ of the movable clutch-jaw G. The periphery of the bearing-flange $D^2$ and the adjacent bearing-surface of the clutch-jaw hub $g$ are preferably formed with semi-cylindrical seats to receive the guide-pins 6, (see Figs. 1 and 5,) the ends of which fit tightly within the holes formed in the body portion of the jaw D. These guide-pins 6, while allowing a free axial movement of the jaw G, insure its accurate rotation with the jaw D. The outer or peripheral portion of the jaw G is formed with double-inclined bearing-faces $g'$, that engage the correspondingly-inclined bearing-faces of the segmental blocks C. The body portion of the movable jaw G is formed with a series of openings $q^2$, through which pass the adjusting-rods F. Each of these rods F passes between a pair of links K, the inner ends of which are pivoted upon bolts $k$ and $k'$, that pass through ribs or flanges $g^3$, projecting axially from the outer face of the body portion of the jaw G. As shown, (see Fig. 1,) each of the links K is formed with a countersunk seat for the head of its corresponding pivot-bolt $k$ or $k'$. The outer ends of the links K are connected by a pivot-bolt M, that passes through the long slot $f$, that is formed adjacent the outer end of the adjusting-rod F. Upon this bolt M bears a shoe or block N, against which presses the point of an adjusting-screw P, that passes through the threaded outer end of the rod F. The adjusting-screw P carries a threaded jam-nut, $p$, whereby the screw may be securely held after it has been shifted to set the shoe N in any desired position. Each of the pivot-bolts M also passes through the inner ends of a pair of links R, the outer ends of which links are pivotally connected by a pin $r$ to a lug $t$ that projects radially from the shifter-sleeve T that is mounted in manner free to be moved in axial direction upon the shaft A'. The shifter-sleeve T is formed with the usual peripheral groove $t'$ to receive the ring V of a clutch-shifter of any suitable construction.

From the foregoing description it will be seen that when the parts are assembled for use, as shown in the accompanying drawings, the shaft A' and the clutch member carried thereby will remain idle (it being assumed that the shaft A is the driving-shaft) so long as the jaws D and G of the clutch are out of clamping bearing with the segmental shoes C, and the jaws D and G are forced normally apart, preferably by means of coil-springs W, (see Fig. 5,) that set within pockets $d^4$, formed in the body of the clutch D, the opposite ends of these springs bearing against and tending to thrust outward the jaw G. If now, however, the attendant moves inward the clutch-shifter sleeve T, the toggle-links R and K will be swung upward; but inasmuch as the links K move in a different arc from the rod F the rods K will be moved inward, thereby causing the corresponding inward movement of the movable jaw G until the segmental blocks C are clamped between the double-inclined bearing-faces of the jaws D and G. If the clutch-shifter sleeve T be moved inward to a sufficient extent, the jaws D and G will so firmly grip the segmental blocks C as to insure a unison movement of these blocks, and consequently of the clutch member that carried them with the gripping-jaws. On the other hand, if the inward movement of the clutch-shifter sleeve T be not so great then a slip movement to greater or less extent will be permitted between the jaws D and G and the segmental blocks C. By means of the adjusting-screws P and the shoes N the action of the toggle-links K and R can be readily controlled and a delicate yet easy adjustment of the shoes N can be effected. Inasmuch as the segmental blocks C are provided with double-inclined bearing-faces, a largely-increased frictional surface is afforded between the blocks carried by one clutch member and the jaws carried by the other, and as the segmental blocks extend substantially around all the circumference of the clutch member a most effective bearing-surface is afforded. As stated, the series of friction-blocks C are independently and loosely held in the clutch member B, so that they may each move independently of the others in axial direction or otherwise shift to accommodate themselves to the jaws. By reason of this construction, and since the blocks are provided on their opposite sides with V-shaped bearing-faces that engage the grooved flaring bearing-faces of the jaws, the blocks will accurately center themselves in the jaws, so as to be securely gripped thereby when the jaws are clamped upon the blocks and so that all possible friction-surface between the jaws and blocks is utilized and a very efficient grip is maintained between the jaws of one clutch member and the blocks of the other member. So, also, as the segment-blocks are inclosed there is no danger of such parts becoming loose or displaced, and yet access to the blocks and other parts of the clutch can at all times be readily had. For example, by removing the outer jaw G the old friction-blocks may be removed and replaced by new ones. When the sleeve T is shifted to clamp the jaws upon blocks, the pivot-bolt M is moved slightly beyond the line of centers between the pivots $k$ and $k'$, so that the members F and K form a toggle or dead-center lock to securely hold the jaws clamped upon the bolts. Moreover, in this position of the sleeve T the pivot $r$ moves slightly beyond a plane drawn through the several bolts M, so that the links R and sleeve T form a second toggle or dead-center lock for holding the jaws in place. By thus providing double toggles between the jaws and the clutch-shifter, both of which are arranged to lock on the dead center, it is impossible for the clutch members to accidentally become disengaged. By mounting the movable jaw G on the hub $B^2$ it is properly held and clamped to shift in proper right-line direction to securely grip the friction-blocks. The pins or keys 6, however, securely unite the fixed and movable jaws, so that they necessarily rotate together.

It should be noted that the part of the disk through which the bolts $B^2$ extend is offset inside of the outer face of the disk B, so that the heads of these bolts do not dangerously project.

In Fig. 6 of the drawings I have shown a somewhat modified form of my invention. In this form of the invention the clutch member B is provided at its periphery with a channeled ring B⁴, united thereto by through-bolts B², as in the construction above described; but the ring B⁴ is furnished with two sets of depending arms B⁵ and B⁶, adapted to hold two sets of segment-blocks C' and C², these blocks being similar in construction to the blocks C, hereinbefore described. In this modified form of the invention there is provided a fixed jaw D⁴, formed at the periphery of the plate or disk 10, that is carried by the hub D⁵, mounted upon the shaft A'. Preferably the plate or disk 10 of the fixed jaw D⁴ is an annular plate that is set over and concentric with the plate 11, that is provided with offset-flange 12, through which pass the bolts 13, that securely unite the plates 10 and 11 together. The fixed jaw D⁴ is provided at its opposite sides with annular V-shaped channels $d^4$ and $d^5$, adapted to engage with corresponding V-shaped bearing-surfaces upon the opposing faces of the segmental blocks C' and C². The plate or casting carrying the fixed jaw D⁴ is provided with two annular flanges $d^6$ and $d^7$, concentric with the hub D⁵. Upon one of these flanges $d^6$ is mounted the hub $g^4$ of a movable jaw G⁴, and upon the opposite flange $d^7$ is mounted a hub $g^5$ of the movable jaw G⁵. Each of the jaws G⁴ and G⁵ are provided upon their inner faces with annular V-shaped grooves forming bearing-surfaces to engage the adjacent V-shaped faces of the segmental blocks C² and C'. At different points around the movable jaw G⁴ are pivotally connected, as at 7, the adjusting-rods F, these rods being similar in construction to the adjusting-rods hereinbefore described and being provided with adjustable shoes N, the position of which is controlled by set-screws P and jam-nuts $p$. Through the slot $f$ in each of the rods F passes a bolt M, corresponding to the bolt M, hereinbefore described, and this bolt passes through toggle-links K and R, such as before described, the inner ends of the links K being pivotally connected, as at 8, to the jaw G⁵, while the lower ends of the links R are pivotally connected, as at 9, to the clutch-shifter sleeve T, that is furnished with the shifter-yoke V. From the foregoing description the operation of this modified form of the invention will be seen to be as follows: When the clutch-shifter sleeve T is moved inward, the movable jaws G⁴ and G⁵ will be caused to engage the segmental blocks C² and C', respectively, and these blocks will be forced into engagement with the bearing-surfaces of the fixed jaw D⁴. This form of my invention, as will be readily seen, without entailing any considerable increase of expense largely increases the friction-surfaces of the clutch members, and by so much adds to the efficiency of the clutch. Preferably the springs W are interposed between the plate that carries the fixed jaw D⁴ and the movable jaws G⁴ and G⁵, these springs W being similar to the springs W, hereinbefore described, and serving to force the movable jaws normally away from the segment blocks C' and C². In the form shown in Fig. 6 the friction-blocks may be readily renewed by removing the outer jaw G⁵, the ring B⁴, and the fixed jaw D⁴.

It is obvious that numerous changes may be made in the details of structure without departure from the essentials of the invention.

Having thus described my invention, what I claim as new, and desire to secure by Letters Patent, is—

1. In a friction-clutch, the combination of a clutch member comprising oppositely-disposed, relatively movable jaws having grooved bearing-faces with inclined, flaring walls and a second clutch member having a series of radial lugs fixed thereto, a series of blocks held between said lugs and interposed between and arranged to extend within the grooved bearing-faces of said jaws, said blocks being independently and loosely held in said second clutch member and having oppositely-disposed, inclined bearing-faces corresponding to the bearing-faces of said jaws, whereby said blocks may be accurately centered within and securely gripped between said jaws, substantially as described.

2. In a friction-clutch, the combination of a clutch member comprising a pair of oppositely-disposed, relatively movable jaws having annular, grooved, V-shaped bearing-faces and a second clutch member having a series of radial lugs fixed thereto forming spaces open on one side, a series of wooden blocks held in the spaces between said lugs and interposed between and extending within the grooved bearing-faces of said jaws, said blocks being independently and loosely held in said second clutch member and movable in axial direction relatively thereto and said blocks having V-shaped bearing-faces on their opposite sides corresponding to the bearing-faces of said jaws, whereby said blocks will be accurately centered within and securely gripped by said jaws when the latter are clamped upon the same, substantially as described.

3. A friction-clutch comprising one member carrying a series of blocks formed upon their opposite faces with V-shaped bearing-surfaces and independently and loosely held within said member, and another member comprising jaws having circular V-shaped bearing-faces arranged upon opposite sides of said segmental blocks and within which jaws said blocks extend, substantially as described.

4. A friction-clutch comprising a disk-like member provided at its periphery with an overhanging annular part, provided with inwardly-depending projections fixed thereto, a series of friction-blocks interposed between said projections and independently movable axially with respect thereto and having bearing-faces upon their opposite sides, another member having two jaws arranged at opposite sides of said blocks and means for clamping said jaws against said blocks.

5. A friction-clutch comprising a disk-like member provided at its periphery with an overhanging annular part, provided with inwardly-depending projections fixed thereto and forming spaces open at their inner sides, a series of wooden friction-blocks interposed in spaces between said projections, said friction-blocks being held in manner free to move independently and axially and being provided at their opposite sides with V-shaped bearing-faces, another member comprising two jaws arranged at opposite sides of said blocks and having V-shaped annular grooves to engage the bearing-faces of said blocks, and means for clamping said jaws against said blocks.

6. A friction-clutch comprising a disk-like member provided at its periphery with an overhanging annular part removably bolted thereto, provided with inwardly-depending projections fixed thereto and forming spaces open at their inner sides, a series of friction-blocks interposed in spaces between said projections, said friction-blocks being held in manner free to move independently and axially, and being provided at their opposite sides with V-shaped bearing-faces, another member comprising two jaws arranged at opposite sides of said blocks and having V-shaped annular grooves to engage the bearing-faces of said blocks, one of said jaws being fixed and the other of said jaws being mounted to move in axial direction, and toggle-links for shifting said movable jaw.

7. A friction-clutch comprising one member carrying blocks provided with inclined bearing-faces and another member provided with jaws to engage said bearing-faces and means for clamping said jaws against said blocks, comprising toggle-links connected to said jaws, a bolt uniting said toggle-links, an adjustable bearing for said bolt and means for shifting said toggle-links.

8. A friction-clutch comprising one member provided with bearing-surfaces and another member provided with jaws engaging the opposite sides of said bearing-surfaces, one of said jaws being movable, toggle-links for shifting said movable jaw, a bolt uniting said toggle-links, one of said links, having an adjustable shoe engaging said bolt and a set-screw carried at the end of said link for adjusting said shoe.

9. A friction-clutch comprising a member having a series of radially-extending projections or lugs fixed thereto, a series of friction-blocks independently and loosely held between the lugs of said member and each movable independently in axial direction relatively thereto, a second clutch member comprising a pair of oppositely-disposed jaws having circular, grooved bearing-faces with flaring walls, said blocks being arranged to extend within the grooved bearing-faces of said jaws and having oppositely-disposed, inclined bearing-faces corresponding to the bearing-faces of said jaws and means for clamping said jaws upon said blocks, substantially as described.

10. A friction-clutch comprising a disk-like member having at its periphery an overhanging annular part provided with an inwardly-extending portion carrying a series of friction-blocks, said blocks being held in manner to move independently and axially, a second clutch member comprising a hub portion and a pair of circular or ring-like jaws arranged on opposite sides of said series of blocks, one of said jaws snugly fitting upon the hub portion of said second clutch member and keyed to slide axially thereon and means for clamping said jaws upon said blocks, substantially as described.

11. A friction-clutch, comprising one member carrying a series of blocks and a second member provided with a pair of circular or disk-like jaws arranged on opposite sides of said series of blocks, pairs of toggle-links, the links of each pair being pivoted respectively to said jaws and to each other, a sliding sleeve and links connecting said sleeve to the connecting-bolts between said toggle-links, substantially as described.

ALBERT MASTER.

Witnesses:
GEO. P. FISHER, Jr.,
KATHARINE GERLACH.